US008655833B2

(12) United States Patent
Gupta et al.

(10) Patent No.: US 8,655,833 B2
(45) Date of Patent: Feb. 18, 2014

(54) DATABASE ARCHITECTURE FOR SUPPORTING GROUP COMMUNICATIONS AMONG WIRELESS COMMUNICATION DEVICES

(75) Inventors: Rashim Gupta, San Diego, CA (US); Gidhendran Sellamuthu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1259 days.

(21) Appl. No.: 12/140,981

(22) Filed: Jun. 17, 2008

(65) Prior Publication Data

US 2009/0313252 A1 Dec. 17, 2009

(51) Int. Cl.
G06F 7/00 (2006.01)
G06F 13/00 (2006.01)

(52) U.S. Cl.
USPC .......................... 707/610; 711/141; 711/161

(58) Field of Classification Search
USPC .................. 707/201, 203, 610; 711/141, 161
See application file for complete search history.

(56) References Cited

U.S. PATENT DOCUMENTS

| 5,724,648 | A | 3/1998 | Shaughnessy et al. |
| 6,760,815 | B1 * | 7/2004 | Traversat et al. ............. 711/135 |
| 7,065,618 | B1 * | 6/2006 | Ghemawat et al. .......... 711/161 |
| 7,308,607 | B2 * | 12/2007 | Reinhardt et al. ............. 714/25 |
| 7,412,568 | B2 * | 8/2008 | Dai et al. ...................... 711/141 |
| 7,934,080 | B2 * | 4/2011 | Caprioli et al. ............... 712/220 |
| 8,015,362 | B2 * | 9/2011 | Alexander et al. ........... 711/141 |
| 2002/0156786 | A1 | 10/2002 | Martin et al. |
| 2007/0005664 | A1 | 1/2007 | Kodavalla et al. |
| 2007/0192545 | A1 * | 8/2007 | Gara et al. .................... 711/141 |
| 2008/0034164 | A1 | 2/2008 | Dai et al. |

FOREIGN PATENT DOCUMENTS

| GB | 2394816 | 5/2004 |
| JP | H09204339 A | 8/1997 |
| JP | 2001184250 A | 7/2001 |
| JP | 2002273158 A | 9/2002 |
| JP | 2003244142 A | 8/2003 |

(Continued)

OTHER PUBLICATIONS

International Preliminary Report on Patentability—PCT/US2009/046673, The International Bureau of WIPO—Geneva, Switzerland, Oct. 8, 2010.

(Continued)

*Primary Examiner* — Apu Mofiz
*Assistant Examiner* — Chelcie Daye
(74) *Attorney, Agent, or Firm* — Raphael Freiwirth (57) ABSTRACT

A system and method for continually updating a large and substantially continually changing dataset that is accessed by multiple application threads, such as a group identity database of members in communication groups of wireless communication devices. A first server holds the group identity database and, as application threads on the first server access the database to set up group communications, a second server sends new group identity data to update the database, with the new data arriving as discrete, ordered blocks. A first server-resident data-index table is updated with the ordering information of the new data blocks, and a first server-resident checkpointing thread places the ordering information of the new data blocks into a checkpoint cache and checkpoints the ordering information as the new data blocks are updated into the group identity database and verifies the ordering (or version) of the data as against the data-index table.

32 Claims, 5 Drawing Sheets

(56) References Cited

FOREIGN PATENT DOCUMENTS

| | | | |
|---|---|---|---|
| JP | 2004177995 | A | 6/2004 |
| JP | 2008059114 | A | 3/2008 |
| JP | 2010531003 | A | 9/2010 |
| WO | 2008146125 | A1 | 12/2008 |

OTHER PUBLICATIONS

International Search Report, PCT/US2009/046673, International Searching Authority, European Patent Office, Dec. 16, 2009.

Written Opinion, PCT/US2009/046673, International Searching Authority, European Patent Office, Dec. 16, 2009.

* cited by examiner

DATABASE ARCHITECTURE FOR SUPPORTING GROUP COMMUNICATIONS AMONG WIRELESS COMMUNICATION DEVICES

BACKGROUND OF THE INVENTION

1. Field of the Invention

The present invention relates to computer database structures. More specifically, the present invention relates to a scalable and multi-threaded database architecture that is particularly fault-tolerant and advantageous for use in group communication control among a communicating group of wireless communication devices.

2. Description of the Related Art

There exists a wireless telecommunication service that provides a quick one-to-one or one-to-many communication that is generically referred to as "Push-To-Talk" (PTT) capability. The specific PTT group of recipient devices for the communicating wireless device is commonly set up by the carrier and held on a database accessible to a server that sets up and controls the group communications. A PTT communication connection is typically initiated by a single button-push on the wireless device that activates a half-duplex link between the speaker and each member device of the group and once the button is released, the device can receive incoming PTT transmissions once the button is released. In some arrangements, the PTT speaker will have the "floor" where no other group member can speak while the speaker is speaking, and it is up to the communication server to determine which device has the floor. Once the speaker releases the PTT button, any other individual member of the group can engage their PTT button and they will have the floor.

A problem occurs when a database, such as the database that holds the group information of PTT groups, needs to be constantly updated with new information, e.g. new PTT groups are being added at the carrier, yet also be accessed as new group communications occur. Thus, the carrier (or other server) needs to transmit the new group data to the database that is typically accessible by the group communication server, so that the group communication server can update its records in memory in order and also can checkpoint the data in its database in order, i.e. match the correct group information that is provided by the carrier or other entity.

This updating typically occurs with the carrier server sending new data in multiple packets, with each packet having multiple records that are stored in order. The group communication server (or other receiving server) spawns a new thread for each incoming packet and then updates the server's memory and checkpoints it into a database. With a very large number of records and virtually constant access of the database as it is being updated, the likelihood of a failed update increases. Moreover, if a crash or failed transmission occurs in sending the new data such that the receiving server needs to restart, the receiving server can only read those records from the checkpoint that are stored in order and will otherwise need to request that the carrier server again update the receiving server with data from the last record it read from the checkpoint in order, which in the worst case requires restarting the data transmission from the beginning.

A common solution to this problem with a database that needs to be constantly updated and accessed is to use a queue for incoming packets and then choose a specific packet for updating in order. Once an application thread controls the packet, in order, the packet order will be updated in the cache and will also form a checkpoint for determining how far the update has progressed. However, an error in the order receipt of packets, which is common in a packet network such as the Internet or other TCP/IP switched network, will cause the storage to fail if the queue is filled before the correctly ordered packet is located for the updating process.

Accordingly, it would be advantageous to provide an improved database architecture that would reliably allow the receipt of new ordered data and updating of the database with the correct order of new data without a significant risk of failure and the need to resend the entire new data transmission. The updating of the data within the database should not interfere with the accessing of the updating database by other applications. It is thus to the provision of such an improved database architecture that the present invention is primarily directed.

SUMMARY OF THE INVENTION

Briefly described, the present invention is for an architecture that allows for the continual updating of a large and substantially continually changing dataset that is accessed by multiple application threads, such as a group identity database of members in communication groups of wireless communication devices. A first server has access to a group identity database and, as application threads access the database to set up group communications among member wireless communication devices, a second server, such as a carrier server, sends new group identity data to update the database, with the new data arriving as discrete, ordered blocks. A data-index table at the first server is updated with the ordering information of the new data blocks, and a checkpointing thread on the first server places the ordering information of the new data blocks into a checkpoint cache and checkpoints the ordering information as the new data blocks are updated into the group identity database, to thereby verify the ordering (or version) of the data against the data-index table as data is taken from the checkpointing cache to update the dataset in memory. In this manner, the present architecture does not rely on the use of a single cache, buffer, or queue to both receive the incoming data blocks and checkpoint the blocks insertion into memory.

In one embodiment, the system for continually updating a large and substantially continually changing dataset that is accessed by multiple application threads includes a first server configured to selectively control the substantially continually changing first dataset (such as communication group identity database), with the first server including a plurality of application threads resident thereupon, including a checkpointing thread, and the first server further including a checkpointing cache and a data-index table, with the first data set substantially consistently being accessed by, at least, the application threads resident on the first server. The system has a second server configured to selectively send new data from a second data set to the first server for inclusion into the first dataset, such as new group identification information, the new data comprised of discrete, ordered blocks. When the new data is received, the data-index table is updated and, at least, the ordering information of the data blocks is placed into the checkpointing cache. For each block of new data to be included in (or updated into) the first data set, the checkpointing thread compares the ordering information of the data block in the data-index table to the ordering information for the data block in the checkpointing cache, and upon the comparison indicating the correct ordering information for the order of the data block to be included in the first data set, the checkpointing thread includes that data block into the first data set; otherwise, upon the comparison indicating incorrect ordering information for the data block to be included in the first data set, the checkpointing thread discards that data block and awaits the data block of the correct order from the checkpointing cache. Alternately, the checkpointing thread can request the missing data block(s) from the second server.

In one embodiment, the method for continually updating a large and substantially continually changing dataset that is accessed by multiple application threads includes the steps of receiving new data comprised of discrete, ordered blocks at the first server which is configured to selectively control the substantially continually changing first dataset, the new data from a second dataset, and the first server including a plurality of application threads resident thereupon, including a checkpointing thread, and the first server further including a checkpointing cache and a data-index table, wherein the first data set is substantially continuously being accessed by, at least, the application threads resident on the first server. Then, updating the data-index table as new data blocks are received at the first server from, with the data-index table containing the ordering information of data blocks held within the second dataset and placing the ordering information of the data blocks into the checkpointing cache. Then, for each block of new data to be included in the first data set, the checkpointing thread compares the ordering information of the data block in the data-index table to the ordering information for the data block in the checkpointing cache, and upon the comparison indicating the correct ordering information for the order of the data block to be included in the first data set, the checkpointing thread includes that data block into first data set; otherwise, upon the comparison indicating incorrect ordering information for the data block to be included in the first data set, the checkpointing thread discards that data block and awaits the data block of the correct order from the checkpointing cache.

In one embodiment, there is provided a server that is configured to selectively control the substantially continually updated and changing resident dataset, with the server including a plurality of resident application threads, including a checkpointing thread, a checkpointing cache, a data-index table, and a first data set substantially continuously being accessed by, at least, the application threads resident on the first server. The first dataset being at least periodically updated with data blocks from a second dataset, with the second dataset comprised of discrete, ordered blocks. On the server, the data-index table is updated as new data blocks from the second dataset are received with the data-index table containing the ordering information of data blocks held within the second data set. Accordingly, as new data blocks are received at the server, at least the ordering information of the data blocks is placed into the checkpointing cache (alternately, the entire blocks of data can be placed therein), and then for each block of new data to be included in the first data set, the checkpointing thread compares the ordering information of the data block in the data-index table to the ordering information for the data block in the checkpointing cache, and upon the comparison indicating the correct ordering information for the order of the data block to be included in the first data set, the checkpointing thread includes that data block into the first data set. Otherwise, upon the comparison indicating incorrect ordering information for the data block to be included in the first data set, the checkpointing thread discards that data block (or causes the block not to be written) and awaits the data block of the correct order from the checkpointing cache.

The present architecture, and corresponding systems, methods, and components are therefore advantageous in that they allow the receipt of new ordered data and updating of a dataset with the correct order of new data thus minimizing the risk of failure and the need to resend the entire new data transmission. The dataset (database) can still be accessed by other applications while the correctly-ordered new data is added. Moreover, the dataset is readily scalable with the present architecture.

Other objects, features, and advantages of the present invention will become apparent after review of the Brief Description of the Drawings, Detailed Description of the Invention, and the Claims.

DETAILED DESCRIPTION OF THE INVENTION

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

Figure 1:
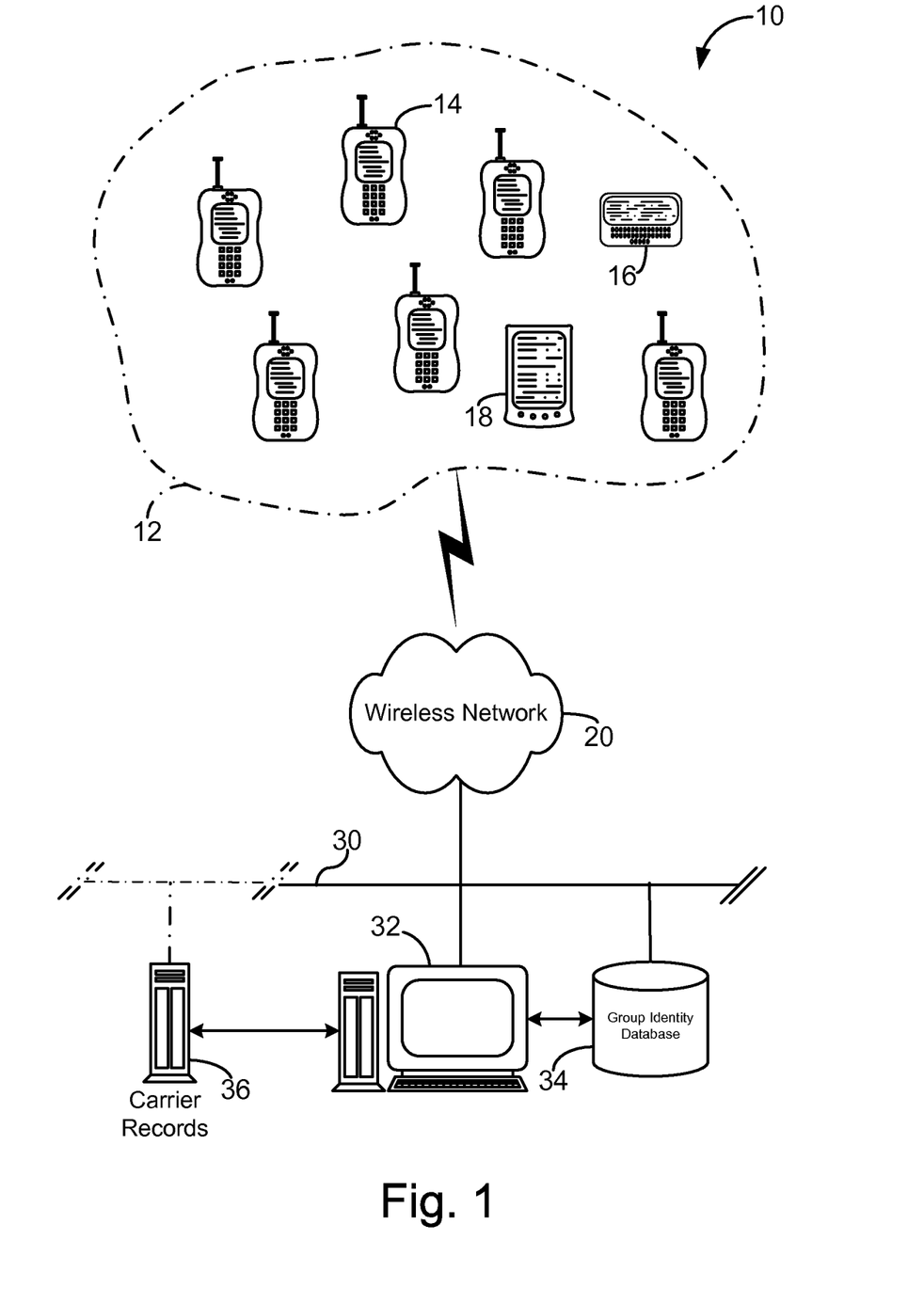
FIG. 1 is a representative diagram of a wireless network with a designated PTT group of wireless telecommunication devices communicating with a group communication server and a carrier server sending updated group records to the group communication server.

With reference to the figures in which like numerals represent like elements throughout, FIG. 1 illustrates one embodiment of the system 10 for providing an improved architecture for updating and accessing of a group identity database for wireless telecommunication devices in a PTT group 12, such as the wireless telephone 14, smart pager 16 and personal digital assistant (PDA) 18, with other wireless telecommunication devices across a wireless network 20. In the system 10, each wireless telecommunication device 14, 16, 18 is capable of selectively directly or indirectly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

Typically, the wireless telecommunication device (such as mobile telephone 14) notifies the group communication computer device, shown here as a group communication server 32, which is present on a server-side LAN 30 across the wireless network 20, that the wireless device is present, i.e. accessible, on the wireless network 20. The group communication computer device can either keep the information on group member devices on the wireless network 20 or share this information with the set of target wireless telecommunication devices designated by the first wireless telecommunication device, or can also share it with other computer devices resident on the server-side LAN 30 or accessible across the wireless network 20. The group communication server 32 can have an attached or accessible group identity database 34 to store the group identification data for the wireless devices. Here, a carrier server 36, either present on the server-side LAN 30 or electronically accessible to the group communication server 32, will send group identity information to the group communication server 32 for updating of the group member information that server is responsible for hosting. It should be appreciated that the number of computer components resident on server-side LAN 30, or across the wireless network 20, or Internet generally, are not limited.

A group communication, such as a PTT voice communication can be established through a half-duplex channel between the communicating wireless telecommunication device 14, 16, 18 and the one or more other wireless telecommunication devices of the target set. Also, the group communication computer server 32 can attempt to bridge the requested direct communication with the target set without knowledge of the wireless telecommunication devices of the target set actually receiving the PTT communication sent. Alternately, the group communication computer server 32 can inform the PTT transmitting wireless telecommunication device 14, 16, 18 of the inability to bridge a direct communication to the target set. Further, while the group communication computer server 32 is shown here as having the attached database 34 of group identification data, other computer devices can have group identity data resident thereupon, and perform all storage functions described herein. For example, the group communication sever 32 can be a regional group authority that is solely dedicated to managing the group information as requested from other server controlling communication groups. The present system 10 is thus a scalable, multi-threaded and fault-tolerant architecture for transmitting data between two servers in a PTT environment.

Figure 2:
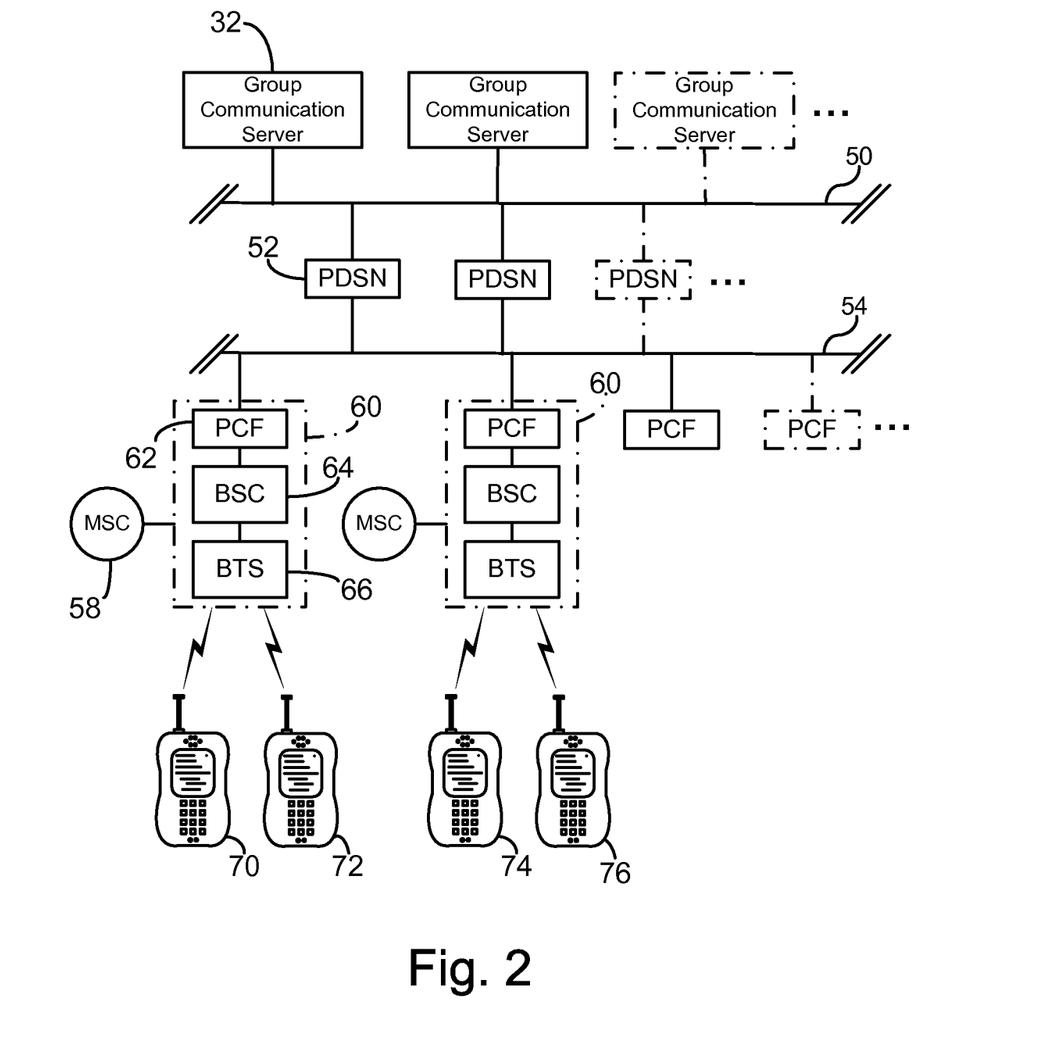
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of group communication computer devices (group communication servers) 32 that control communications between the wireless communication devices of set group members (devices 70, 72, 74, 76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless communication devices 14, 16, 18 can request packet data sessions from the group communication server(s) 32 using a data service option, such as signals in the EvDO or CDMA2000 standard.

The group communication server(s) 32 are connected to a wireless service provider's packet data service node (PDSN) such as PDSN 52, shown here resident on a carrier network 54. Each PDSN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 54 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Figure 3:
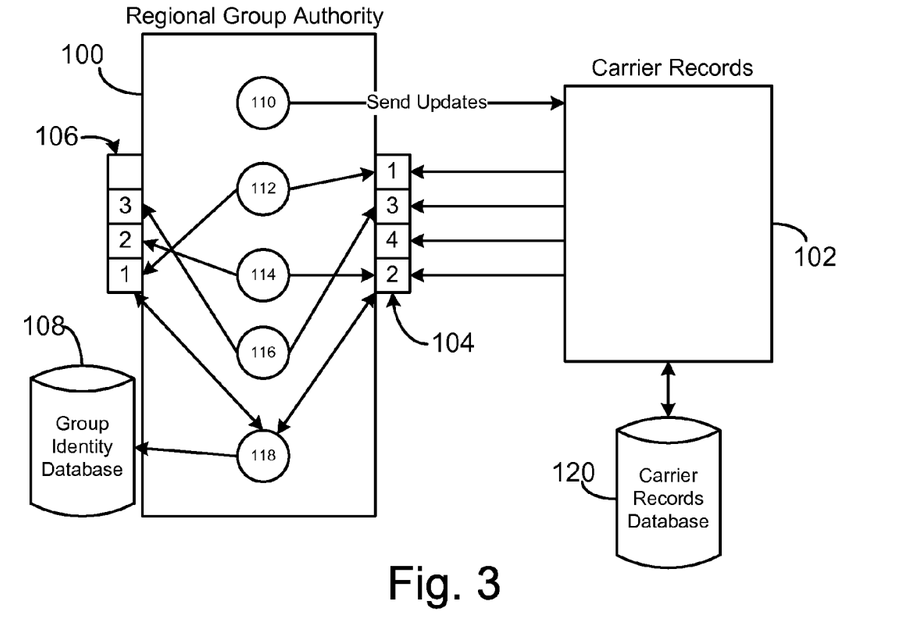
FIG. 3 is a representative diagram illustrating the group communication server (or a regional group authority) retrieving new group data from a carrier server and updating the locally stored group information.

FIG. 3 is a representative diagram illustrating the regional group authority (RGA) 100 (or alternately a group communication server) retrieving new group data from a carrier server 102 and updating the locally stored group information on group identity database 108. The RGA 100, here one or more servers, is configured to selectively control a substantially continually changing first dataset in the group identity database 108. The RGA 100 includes a plurality of application threads resident thereupon, such as threads 112,114,116, and also includes a checkpointing thread 118. The RGA 100 has a checkpointing cache 104 and a data-index table 106, with the group identity database 108 being substantially and consistently accessed (although not necessarily continuously accessed) by, at least, the application threads resident on the RGA 100, which here would be to set up group communications.

A carrier server 102 (or servers or other computer devices) selectively send new data in the forms of new communication group records to the RGA 100 for inclusion into the group identity database 108 (or other dataset). The new group data is comprised of discrete, ordered blocks, wherein the data-index table 106 will be updated to reflect the ordering information of the new data blocks as they are received at the RGA 100. As new data blocks are received at the RGA 100 from the carrier server 102, at least the ordering information of the data blocks, and preferably the data block, is placed into the checkpointing cache 104. For each block of new data to be included in the group identity database 108, the checkpointing thread 118 compares the ordering information of the data block in the data-index table 106 to the ordering information for the data block in the checkpointing cache 104, and upon comparison indicating that the correct ordering information for the order of the data block to be included in the group identity database 108, the checkpointing thread 118 including that data block into the group identity database 108. Otherwise, upon the comparison indicating incorrect ordering information for the data block to be included in the group identity database 108, the checkpointing thread 118 discarding that data block and awaiting the data block of the correct order from the checkpointing cache 104.

In one embodiment, checkpointing thread 118 further places the data block having correct ordering information into the group identity database 108 of the RGA 100. The RGA 100 can further be configured to selectively request new data from the carrier server 102, such as through request thread 110. The carrier server 102 is also shown here as being in contact with a secondary operator database 120 that provides new records to the carrier server 102. Also, upon the comparison indicating incorrect ordering information for the data block to be included in the group identity database 108, the checkpointing thread 118 can further request the data block of correct order from the carrier server 102.

In operation, the updating the memory of the RGA 100 can be performed in any order, but the attribute of the last updated version number (or "LastUpdatedVersionNumber"as a data item) must be tracked to verify that the group identity database 108 is correct and up to date. This also is required so that if the updating times out, a request can be made to the carrier server 102 for the exact record number from where the updating process left off.

In one embodiment, the application threads 112, 114, 116 keep waiting for data packets from the carrier server 102 and once a packet arrives, any thread can process it, irrespective of the packet being in order or not. There is a global counter included in the packet: "LastUpdatedVersionNumber" and also a Hash Map with a (key, value) pair as (beginning Record number, end Record number). Thus, when a thread receives an "updateGroupDefReq" packet, i.e. new data is coming in, the checkpointing thread 118 first checks for the Record number and matches this with the "LastUpdatedVersionNumber." If it matches, it updates the LastUpdatedVersion Number ending Record number of this packet. If it does not match it adds it to the hash table. After processing of this packet is over, the thread does a quick lookup O(I) at the hash-table for the next packet it is expecting (as some other thread might have updated that packet before this one). If the thread locates it, the thread updates the LastUpdatedVersionNumber with the ending version number of the record found in the hash table and removes the record from the hash table. Thus, a strict ordering may be maintained for the "LastUpdatedVersionNumber," in the data index table 106.

The checkpointing of the updates to memory (or the group identity database 108) must be strictly in order after a RGA 100 failover, and the process can read from the checkpoint the last updated version number and then ask the carrier server 102 for the remaining version numbers. In one embodiment, there will be 2 tables stored in a "mysql" database: the data index table 106 Table-Cache, which will contain all the data that is present in the current version of the records of the carrier server 102, and a checkpoint cache 104, which can be a table of the "LastVersionNumberCheckpointed". The checkpointing cache 104 (here the table) is different from the table used for updating the general memory cache of the RGA 100. The version number in the LastVersioiNumberCheckpointed signifies the last operation that was checkpointed in sequence by the checkpointing thread 118 in the group identity database 108, and before which it is safe to read from the checkpoint without losing any information.

When the checkpointing thread 118 reads a message from the checkpointing queue 104, it first looks at an attribute "LastVersionNumberCheckpointedinMemory" (which is same as "LastVersionNumberCheckpointed" in the group identity database 108) and determines whether the message is in-order or out of order. If the message is out of order, the checkpointing thread 118 stores the starting version number and the ending version number in a Map as a key, value pair. There is preferably an additional field in the map which the checkpointing thread 118 sets to 0 if it is currently checkpointing and 1 if it has finished checkpointing. When the checkpointing thread 118 eventually gets an in-order packet (by looking at LastVersionNumberCheckpointed), the checkpointing thread 118 checkpoints the packet and recursively looks at the data index table 106 for the next starting version number and finally checkpoints this to the group identity database 108 table "LastVersionNumberCheckpointed." Thus every record below record number "LastVersionNumberCheckpointed" is checkpointed as in the group identity database 108.

Figure 4:
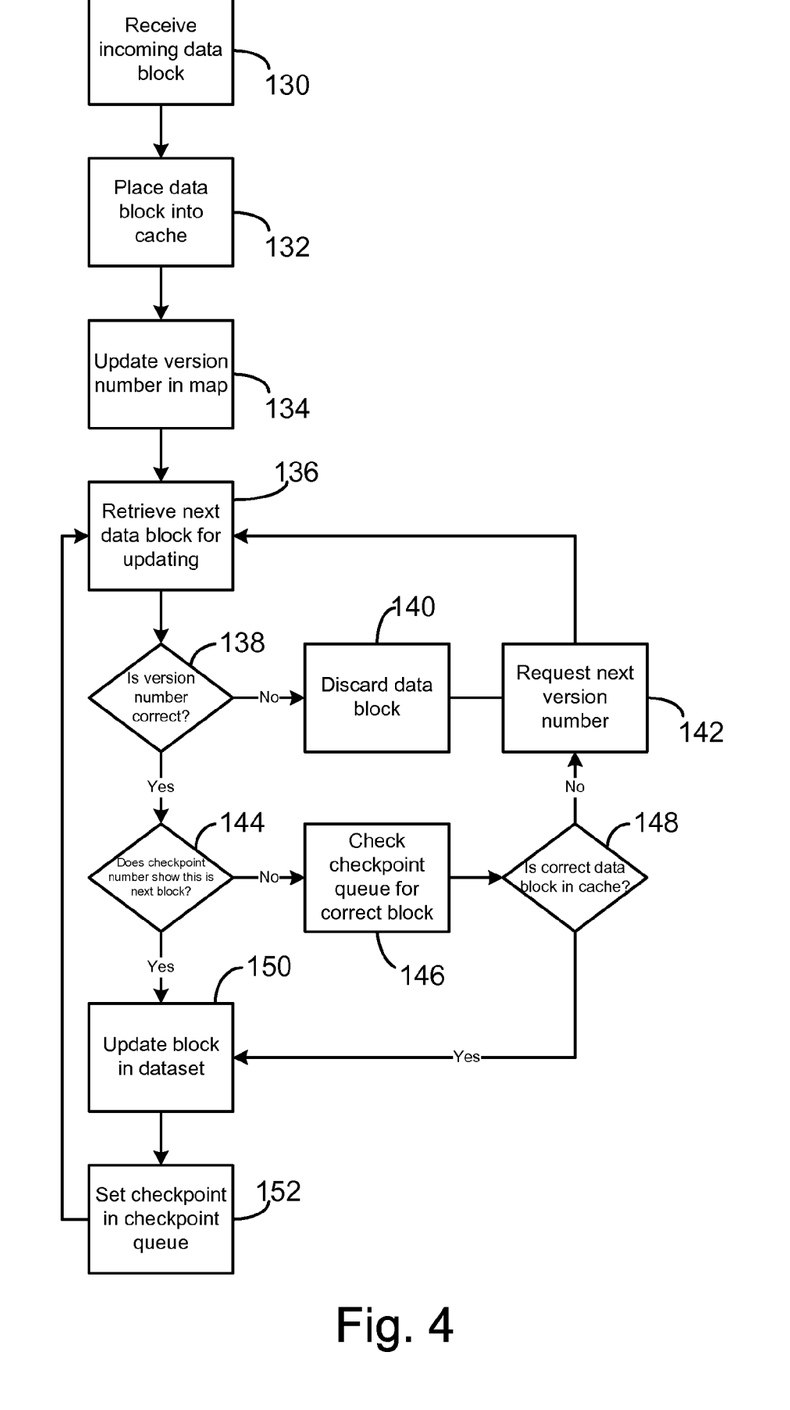
FIG. 4 is a flowchart of one embodiment of the process for updating the group identity database at the group communication server.

Thus, one embodiment of this process of the checkpointing during the updating of the group identity database 108, is shown in the flowchart of FIG. 4. An incoming data block (or packet) is received, as shown at step 130, and then the data block is placed into the memory cache, as shown at step 132, which may be done by a worker thread. The version of the data block is updated in the memory map (such as data-index table 106) as shown at step 134, and then the data block is retrieved by the checkpointing thread 118 for updating into the group identity database 108, as shown at step 134. The next data block is retrieved at step 136.

A determination is first made regarding whether the version number is correct for the data block, as show at decision 138, and if not, the data block is discarded, as shown at step 140 and the next version number (or correct version) can be requested from the carrier server 102, as shown at step 142, and the process returns to retrieve the next data block at step 136. Otherwise, if the version number was correct at decision 138, a determination is then made regarding whether the checkpoint number in the checkpointing cache 104 is correct for this block to be updated in memory, as shown by decision 144.

If the checkpointing number is incorrect at decision 144, such as if the block has already been taken out to be written or the block is missing, the checkpointing thread 118 checks the checkpointing queue (or alternately a checkpointing cache) 104 for the correct block, as shown at step 146, and then the determination of the correct checkpointing is made at decision 148. If the correct checkpointed data block is located, the data block is updated in the dataset (or here, group identity database 108), as shown at step 150, the checkpoint in the checkpointing queue is updated and the process returns to retrieve the next data block for updating at step 136. Otherwise, if the correctly checkpointed data block is not located at decision 148, the process will request the correct version number for the desired data block from the carrier server 102, at step 142, and then return to retrieve the next data block for updating, at step 136.

If the correctly checkpointed data block is present at decision 144, then the data block is updated, as shown at step 150, and the checkpoint is updated in the checkpoint queue, as shown at step 152, and the process returns to retrieve the next data block for updating at step 136. As new group records are almost constantly arriving at the RGA 100, the present process will in most instances be continuous, but the process can end upon no data blocks for updating being present, and restart upon the receipt of new data blocks.

Figure 5:
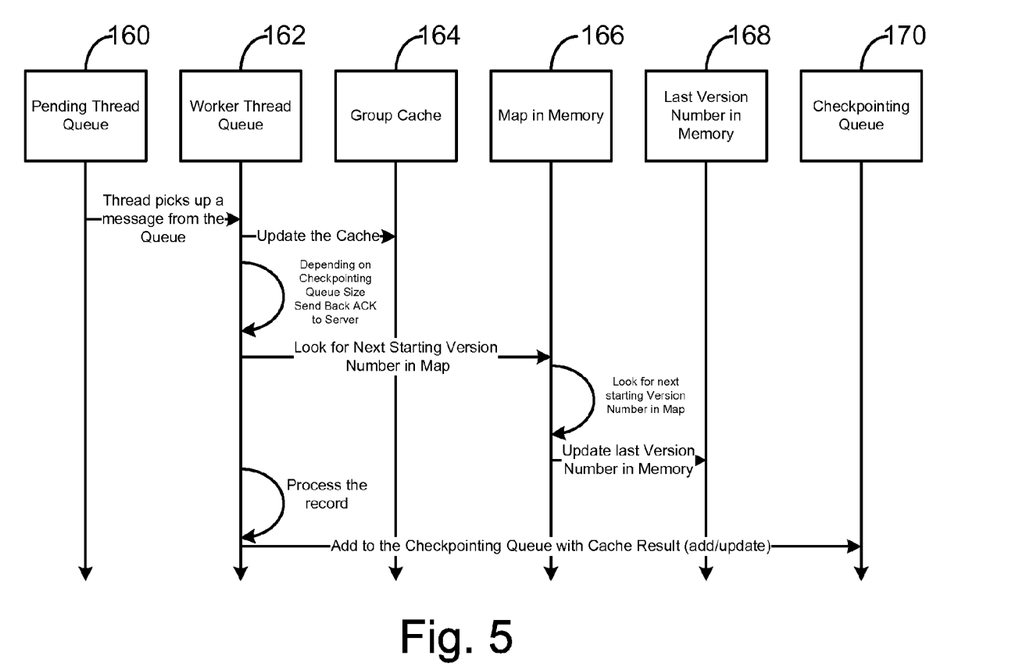
FIG. 5 is a representative diagram of one embodiment of the process for the group communication server to handle the incoming packets and updating a resident cache with the incoming packet.

FIG. 5 is a representative diagram of one embodiment of the timeline of a process for the group communication server to handle the incoming packets and updating a resident cache with the incoming packet. Here, there is a pending thread queue 160 that holds incoming messages (such as data blocks or packets) and the worker thread utilizes a worker thread queue 162, and the worker thread updates a group cache 164, determines if the thread can place the message into the memory map, and if so, acknowledges receipt to the carrier server 102, and looks for the next starting number in the memory map 166, and then updates the last version number in memory 168, such as the data index table 106. The worker thread then processes the record and adds the message to the checkpointing queue 170 now that the data index table 106 is current.

Figure 6A:
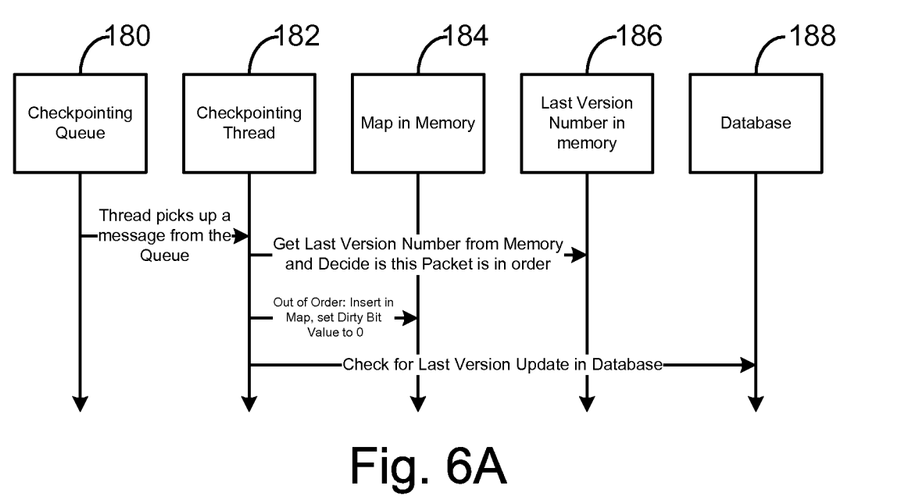
FIG. 6A is a representative diagram of one embodiment of the process for the group communication server to checkpoint the packets as they are taken from the checkpointing cache to be written to memory, and if the packet is out of order.

FIG. 6A is a representative diagram of one embodiment of the process for the group communication server or RGA to checkpoint the message as they are taken from the checkpointing queue 180 to be written to the group identity database 108. Here, the checkpointing thread 182 picks up a message (or data block, packet, etc.) from the checkpointing queue 180, and the checkpointing thread 182 gets the last version number from the memory 186 to determine if the pack is in order, i.e. is current. If the message is out of order, the memory map 184 is updated, here by setting a dirty bit value to zero, indicating the version number the checkpointing thread 182 has is incorrect and that message will be discarded. In this embodiment, the checkpointing thread 182 also then verifies that the incorrect version of the message is not written in the group identity database 188, or can otherwise determine what new data is needed for correct updating.

Figure 6B:
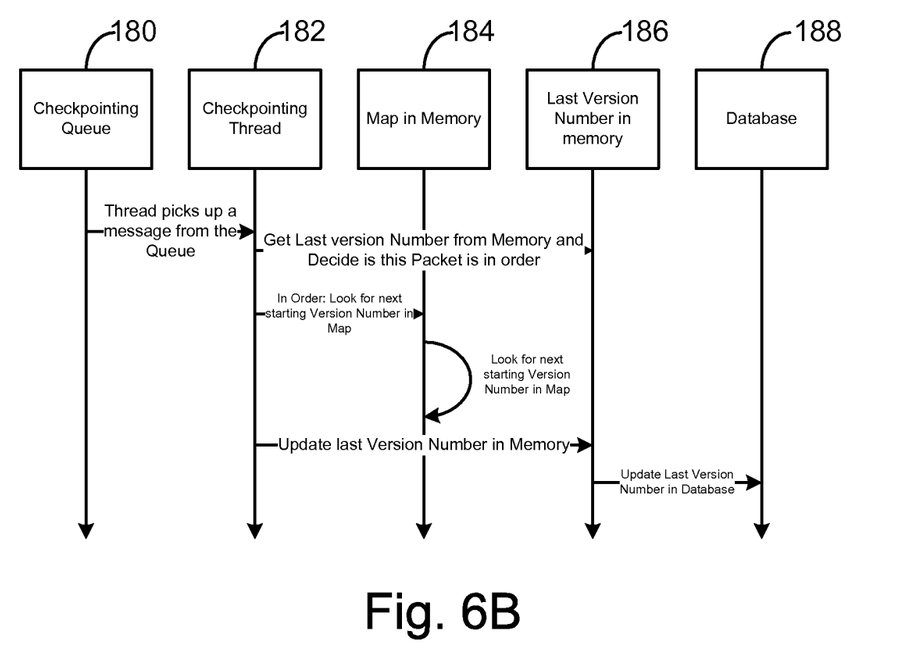
FIG. 6B is a representative diagram of one embodiment of the process for the group communication server to checkpoint the packets as they are taken from the checkpointing cache to be written to memory, and if the packet is in order, updating the packet to memory.

FIG. 6B is a representative diagram of one embodiment of the process following a correct version match in FIG. 6A. Accordingly, after the checkpointing thread 182 has picked up the message (or data block, packet, etc.) from the checkpointing queue 180, and the checkpointing thread 182 gets the last version number from the memory 186 to determine if the pack is in order, the checkpoint thread 182 then determines the next starting version number in the active map in memory 184, and then updates the last version number in memory 186 (which here would be updating the checkpointing queue 180, as well) and then updating the actual data into the group identity database 188. It should be appreciated that a single memory update from an update to the group identity database 188 function could simultaneously update the data index table 106 and checkpointing queue (or cache) 104.

In view of the methods being executable on computer platforms, these steps can accordingly be performed by a program resident in a computer readable medium, where the program directs one or more computer devices having a computer platform to perform the steps recited herein. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored as one or more instructions or code on a non-transitory computer-readable medium. Non-transitory computer-readable media includes both computer storage media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. A system for continually updating a large and substantially continually changing dataset that is accessed by an application thread, comprising:
   a first server configured to selectively control a substantially continually changing first dataset, the first server including a checkpointing thread, the first server further including a checkpointing cache and a data-index table; and
   a second server configured to selectively send new data from a second data set to the first server for inclusion into the first dataset, the new data comprised of discrete, ordered blocks, the second server being remote from the first server,
   wherein the data-index table further contains the ordering information of data blocks held within the second data set, and the first server is configured to update the data-index table as new data blocks are received at the first server from the second server, and
   wherein the first server is further configured such that:
   as new data blocks are received at the first server from the second server, at least the ordering information of the data blocks is placed into the checkpointing cache, and then for each block of new data to be included in the first data set, the checkpointing thread compares the ordering information of the data block in the data-index table to the ordering information for the data block in the checkpointing cache,
   upon the comparison indicating that the ordering information for the order of the data block to be included in the first data set is correct, the checkpointing thread including that data block into the first data set, and
   upon the comparison indicating that the ordering information for the data block to be included in the first data set is incorrect, the checkpointing thread discarding that data block and awaiting the data block of the correct order from the checkpointing cache.

2. The system of claim 1, wherein the first server is further configured such that the checkpointing thread further places the data block having correct ordering information into a memory of the first server.

3. The system of claim 1, wherein the first server is further configured to selectively request new data from the second server.

4. The system of claim 1, wherein the first server is further configured such that, upon the comparison indicating that the ordering information for the data block to be included in the first data set is incorrect, the checkpointing thread further requests the data block of correct order from the second server.

5. The system of claim 1, wherein the first data set is a group identity database for a communication group of wireless communication devices.

6. The system of claim 5, wherein the first server is a group communication server for a communication group of wireless communication devices.

7. The system of claim 5, wherein the first server is further configured such that the application thread accesses the first data set for setting up group communications for communication groups of wireless communication devices.

8. A method for continually updating a large and substantially continually changing dataset that is accessed by an application thread, comprising:
   receiving new data comprised of discrete, ordered blocks at a first server that is configured to selectively control a substantially continually changing first dataset, the new data received from a second dataset resident on a second server remote from the first server, and the first server including a checkpointing thread, the first server further including a checkpointing cache and a data-index table
   updating the data-index table as new data blocks are received at the first server from the second server, the data-index table containing the ordering information of data blocks held within the second dataset;
   placing the ordering information of the data blocks into the checkpointing cache;
   for each block of new data to be included in the first data set, the checkpointing thread comparing the ordering information of the data block in the data-index table to the ordering information for the data block in the checkpointing cache;
   upon the comparison indicating that the ordering information for the order of the data block to be included in the first data set is correct, the checkpointing thread including that data block into the first data set; and
   upon the comparison indicating that the ordering information for the data block to be included in the first data set is incorrect, the checkpointing thread discarding that data block and awaiting the data block of the correct order from the checkpointing cache.

9. The method of claim 8, further comprising the checkpointing thread placing the data block having correct ordering information into a memory of the first server.

10. The method of claim 8, further comprising the first server selectively requesting new data from the second dataset at the second server.

11. The method of claim 10, further comprising, upon the comparison indicating that the ordering information for the data block to be included in the first data set is incorrect, the checkpointing thread requesting the data block of correct order from the second server.

12. The method of claim 8, wherein the first data set is a group identity database for a communication group of wireless communication devices, the method further comprising accessing the first data set with the application thread for setting up group communications for communication groups of wireless communication devices.

13. A server configured to selectively control a substantially continually updated and changing resident dataset, wherein the server is configured with data and executable instructions for performing operations comprising:
   executing a checkpointing thread;
   maintaining a checkpointing cache;
   maintaining a data-index table;
   maintaining a first data set substantially continuously accessed by, at least, an application threads thread resident on the server;
   updating the first dataset being at least periodically with data blocks from a second dataset received from a second server remote from the server, the second dataset comprised of discrete, ordered blocks;
   updating the data-index table as new data blocks from the second dataset are received at the server, the data-index table containing the ordering information of data blocks held within the second data set;
   as new data blocks are received at the server, placing at least the ordering information of the data blocks into the checkpointing cache, and then for each block of new data to be included in the first data set, comparing the ordering information of the data block in the data-index table to the ordering information for the data block in the checkpointing cache;
   upon the comparison indicating that the ordering information for the order of the data block to be included in the first data set is correct, the checkpointing thread including that data block into the first data set; and
   upon the comparison indicating that the ordering information for the data block to be included in the first data set is incorrect, the checkpointing thread discarding that data block and awaiting the data block of the correct order from the checkpointing cache.

14. The server of claim 13, wherein the server is configured with executable instructions for performing operations further comprising the checkpointing thread placing the data block having correct ordering information into a memory of the server.

15. The server of claim 13, wherein the server is further configured with executable instructions for performing operations further comprising requesting new data from the second server.

16. The server of claim 15, wherein the server is configured with executable instructions for performing operations further comprising, upon the comparison indicating that the ordering information for the data block to be included in the first data set is incorrect, the checkpointing thread requesting the data block of correct order from the second server.

17. The server of claim 13, wherein the first data set is a group identity database for a communication group of wireless communication devices.

18. The server of claim 13, wherein the server is a group communication server for a communication group of wireless communication devices.

19. The server of claim 17, wherein the application thread accesses the first data set for setting up group communications for communication groups of wireless communication devices.

20. A server configured to selectively control a substantially continually updated and changing dataset, comprising:
   means for receiving new data comprised of discrete, ordered blocks;
   means for controlling a checkpointing thread;
   means for storing checkpointing data;
   means for storing a data-index;
   means for storing a first data set; and
   means for updating the first dataset at least periodically with data blocks from a second data set received from a second server remote from the server,
   wherein means for storing a data-index further includes means for updating the data-index as new data blocks are received at the server, the data-index containing the ordering information of data blocks held within the second data set,
   wherein means for storing checkpointing data further includes means for storing the ordering information of the data blocks from the second dataset, wherein means for controlling the checkpointing thread comprises means for comparing the ordering information of the data block in the means for storing a data-index to the ordering information for the data block in the means for storing checkpointing data, and wherein means for updating the first dataset comprises:

means for updating the first data set with a data block for each block of new data to be included in the first data set upon the comparison indicating that the ordering information for the order of the data block to be included in the first data set is correct; and means for discarding the data block and awaiting the data block of the correct order from the means for storing checkpointing data upon the comparison indicating that the ordering information for the data block to be included in the first data set is incorrect.

21. The method of claim 12, wherein the first server is a group communication server for a communication group of wireless communication devices.

22. The server of claim 20, further comprising means for placing the data block having correct ordering information into a memory of the server.

23. The server of claim 20, further comprising means for selectively requesting new data from the second dataset at the second server.

24. The server of claim 23, wherein means for updating the first dataset comprises means for requesting the data block of correct order from the second server upon the comparison indicating that the ordering information for the data block to be included in the first data set is incorrect.

25. The server of claim 20, wherein the first data set is a group identity database for a communication group of wireless communication devices, the server further comprising means for accessing the first data set by an application thread for setting up group communications for communication groups of wireless communication devices.

26. The server of claim 25, wherein the server is a group communication server for a communication group of wireless communication devices.

27. A non-transitory computer readable medium having stored thereon processor-executable instructions configured to cause a processor of a first server to perform operations for continually updating a large and substantially continually changing dataset that is accessed by an application thread, comprising:

receiving from a second dataset resident on a second server remote from the first server new data comprised of discrete, ordered blocks at a first server that is configured to selectively control a substantially continually changing first dataset, the first server executing a checkpointing thread, and including a checkpointing cache and a data-index table;

updating the data-index table as new data blocks are received at the first server from the second server, the data-index table containing the ordering information of data blocks held within the second dataset;

placing the ordering information of the data blocks into the checkpointing cache;

for each block of new data to be included in the first data set, the checkpointing thread comparing the ordering information of the data block in the data-index table to the ordering information for the data block in the checkpointing cache;

upon the comparison indicating that the ordering information for the order of the data block to be included in the first data set is correct, the checkpointing thread including that data block into first data set; and upon the comparison indicating that the ordering information for the data block to be included in the first data set is incorrect, the checkpointing thread discarding that data block and awaiting the data block of the correct order from the checkpointing cache.

28. The non-transitory computer readable medium of claim 27, wherein the stored processor-executable instructions are configured to cause a processor of the first server to perform operations further comprising the checkpointing thread placing the data block having correct ordering information into a memory of the first server.

29. The non-transitory computer readable medium of claim 27, wherein the stored processor-executable instructions are configured to cause a processor of the first server to perform operations further comprising the first server selectively requesting new data from the second dataset at the second server.

30. The non-transitory computer readable medium of claim 29, wherein the stored processor-executable instructions are configured to cause a processor of the first server to perform operations further comprising the checkpointing thread requesting the data block of correct order from the second server upon the comparison indicating that the ordering information for the data block to be included in the first data set is incorrect.

31. The non-transitory computer readable medium of claim 27, wherein the first data set is a group identity database for a communication group of wireless communication devices, and wherein the stored processor-executable instructions are configured to cause a processor of the first server to perform operations further comprising accessing the first data set by the application thread for setting up group communications for communication groups of wireless communication devices.

32. The non-transitory computer readable medium of claim 31, wherein the first server is a group communication server for a communication group of wireless communication devices.

* * * * *